Sept. 8, 1936.    C. B. SPASE    2,053,849

CLUTCH PLATE

Filed Jan. 3, 1935

INVENTOR.
Charles B. Spase
BY
Fay, Oberlin & Fay
ATTORNEYS

Patented Sept. 8, 1936

2,053,849

UNITED STATES PATENT OFFICE 2,053,849

CLUTCH PLATE

Charles B. Spase, Syracuse, N. Y., assignor to Ira Saks

Application January 3, 1935, Serial No. 263

11 Claims. (Cl. 192—68)

The present invention relates to a novel form of clutch plate, better known as the cushion or flexible center type.

The general object and nature of the invention is to provide such a cushion center clutch plate which will be of simplified and durable construction. A cushion center clutch plate is subject to the imposition of certain limitations, such as a maximum width which is defined by the distance between the pressure plate of the clutch and the flywheel of the engine; and a limitation as to the degree of relative movement permissible between the hub and disc of the clutch plate. It is, therefore, an object of the invention to provide a clutch plate wherein means for flexible or yieldable movement between the hub and disc will be confined to the occupation of a minimum space, while at the same time such means will be capable of resiliently absorbing a maximum amount of torque with a minimum relative movement between the hub and disc. A further object of the invention is to provide a flexible torque absorbing mechanism disposed between the hub and disc of the plate, which will so function as to increase its flexible resistance in direct proportion to the increase in the rate of power application or relative movement of the parts. Additional objects and advantages of the invention shall become apparent as the following description proceeds.

To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

Figure 1:
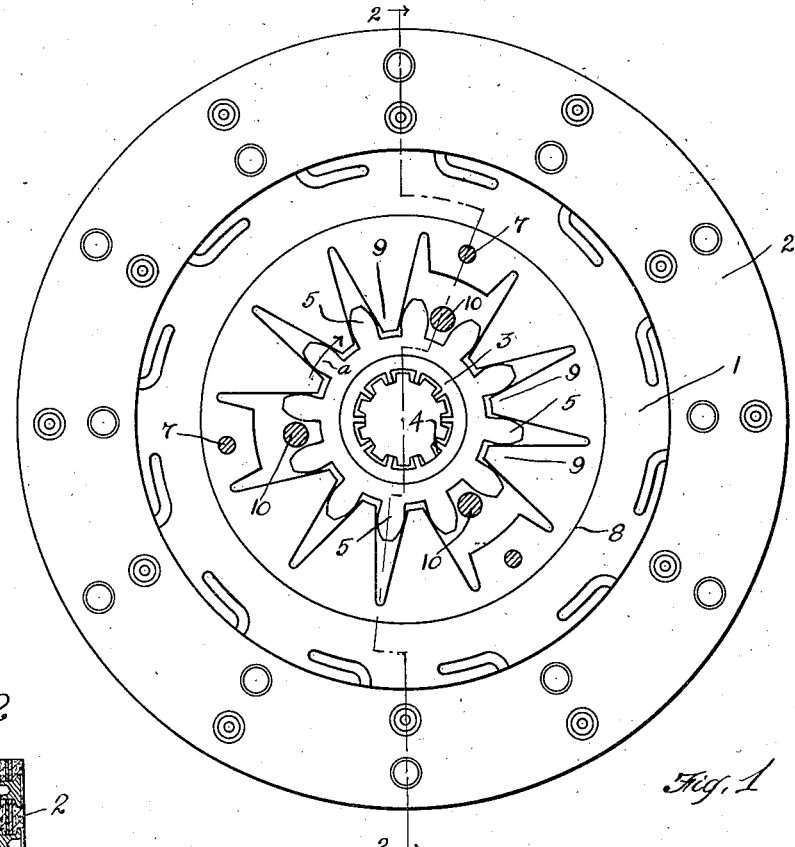
Figure 2:
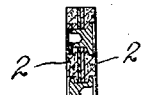
Figure 3:
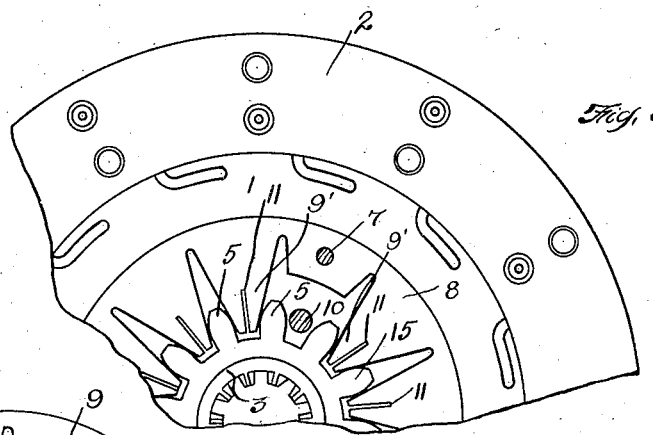
Figure 4:
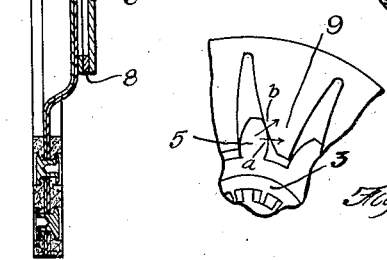

In said annexed drawing:

Fig. 1 is a plan view of a clutch plate embodying the principle of my invention wherein the hub retaining plate has been removed; Fig. 2 is an elevational sectional view taken upon a plane normal to that of Fig. 1 and along section line 2—2 thereof; Fig. 3 is a fragmentary plan view illustrating a modification in construction; Fig. 4 is a fragmentary plan view of a portion of the clutch plate illustrating the relative movement of the parts.

Now referring more particularly to the drawing, there is shown a clutch disc 1 upon whose outer peripheral portions the friction facing rings 2, 2 are attached. The clutch disc 1 in the present illustration is in the form of a double disc type of construction. However, the construction of the outer portion of the disc forms no part of the novel subject matter of the present invention and is therefore not described herein at greater detail.

A hub 3 which is internally splined as at 4 is received in a central opening in the clutch disc 1. A series of stub gear teeth 5 are positioned on the outside of the hub 3 and extend radially therefrom. The hub 3 is retained against axial or longitudinal displacement with respect to the disc 1 by means of the annular retaining or cover plate 6 which is in turn secured to the disc by means of the rivets 7. Another annular member 8 spaces the cover plate 6 from the disc 1 and is positioned therebetween. In the present illustration the annular member 8 is represented as being of a laminated nature, or fabricated from two thicknesses.

A plurality of V-shaped projections 9 extend radially inward of the annular member 8, and the gear teeth 5 are positioned in the slots or recesses defined by the walls of the V-shaped projections 9 and contact with the latter.

As shown in the modified form of construction in Fig. 3, longitudinally and radially disposed slots 11 are positioned in the inner ends of the V-shaped projections 9'. The purpose of the slots 11 is to effect a "pre-loading" function in the event that it is desired to fit the hub 3 and gear teeth 5 against the walls of the projections 9' with an initial spring pressure.

Rigid stop pins 10 are riveted to the disc 1 and the cover plate 6 and are disposed in the spaces between the gear teeth 5 for the purpose of limiting the amount of flexible movement of the hub 3 with respect to the disc 1.

The V-shaped projections 9 and 9' are capable of flexible and yieldable movement in a circumferential direction. Thus when torque is initially applied to the clutch plate, or when the rate of power transmission is increased, the faces of the gear teeth 5 will bear against the faces of the V-shaped projections 9 and 9' and flex or deform the latter whereby a resilient or cushioning action will take place between the hub 3 and the disc 1. It will be obvious that due to the fact that both faces of the gear teeth 5 bear against both faces of the projections 9, such flexible or cushioning action will occur in either direction of rotation of the clutch plate. The limit pins 10 prevent further relative resilient movement between the hub 3 and the disc 1 when the gear teeth 5 bear against them.

Directing attention to Figs. 1 and 4, it will be seen that the gear teeth 5, which may be of cycloidal or involute type, initially contact with the walls of the projections 9 substantially at their pitch circle as denoted by the arrow $a$. Upon further relative movement between the hub 3 and disc 1, the line of contact between the faces of the gear teeth 5 and the walls of the projections 9 will be transferred further out on the gear teeth and further towards the base or thicker portions of the projections 9. Such a change in line of contact is represented by the line $b$ in Fig. 4. In this manner it will be seen that the flexible resistance to the relative movement of the hub 3 with respect to the disc 1 is proportionately increased. Upon initial movement of the hub 3 with respect to the disc 1, the contact of the gear teeth 5 with the projections 9 along the line $a$ is located at a smaller cross-sectional area of the projections 9 and also located at a point closer to the center of the hub 3. On further relative movement, or a change from the line of contact to position $b$, such contact is located at a larger cross-sectional area of the projections 9, which incidentally will be stiffer and more resistant to flexing, and also the point $b$ is further removed from the center of the hub 3, whereby the mechanical advantage or leverage of the force transmitted from the disc 1 to the hub 3 is increased as compared to the mechanical advantage when contact is at point $a$.

Thus it will be seen that the foregoing construction provides a maximum flexible resistance in proportion to a minimum relative movement between the hub and disc of the clutch plate. Such construction eliminates a substantial number of parts heretofore thought to be necessary and occupies a minimum space.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. In a clutch plate, the combination of a disc, a hub centrally mounted on said disc, and normally contacting, intermeshing tooth-like members having their base portions immovably carried on said disc and hub respectively, one set of said tooth-like members being circumferentially yieldable against circumferentially directed pressure, said last-named members being of increasing thickness from their point of contact with said other tooth-like members to their base.

2. In a clutch plate, the combination of a disc, a hub centrally mounted on said disc, inwardly extending circumferentially yieldable projections having their base portions immovably carried on said disc, and outwardly extending, rigid projections on said hub bearing against and intermeshing with said first-named projections, said inwardly extending projections being of increasing thickness from their inner to outer portions.

3. In a clutch plate, the combination of a disc, a hub centrally mounted on said disc, radially extending substantially V-shaped yieldable projections on said disc and spur gear teeth on said hub and fitting between said projections, said V-shaped projections being of solid cross-section and having their narrower ends positioned between said gear teeth.

4. In a clutch plate, the combination of a disc, a hub centrally mounted on said disc, radially extending substantially V-shaped yieldable projections on said disc and spur gear teeth on said hub and fitting between said projections, said gear teeth normally contacting the walls of said projections substantially at their pitch circle, said V-shaped projections being of solid cross-section and having their narrower ends positioned between said gear teeth.

5. In a clutch plate, the combination of a disc, a hub centrally mounted on said disc, intermeshing and normally contacting tooth-like members on said disc and hub respectively, one set of said tooth-like members being circumferentially yieldable against circumferentially directed pressure, said last named members being of increasing thickness from their point of contact with said other tooth-like members to their base, and rigid limit stops on said disc and disposed in spaces unoccupied by said yieldable members between the tooth-like members on said hub for limiting the movement of the latter with respect to said disc.

6. In a clutch plate, the combination of a disc, a hub centrally mounted on said disc, inwardly extending circumferentially yieldable projections on said disc, outwardly extending, rigid projections on said hub bearing against and intermeshing with said first-named projections, said inwardly extending projections being of increasing thickness from their inner to outer portions, and rigid pins extending transversely from said disc and disposed in spaces unoccupied by said yieldable projections between the projections on said hub for limiting the movement of the latter with respect to said disc.

7. In a clutch plate, the combination of a disc, a hub centrally mounted on said disc, radially extending substantially V-shaped yieldable projections on said disc, spur gear teeth on said hub fitting between said projections, said V-shaped projections being of solid cross-section and having their narrower ends positioned between said gear teeth, and rigid pins extending transversely from said disc and disposed in spaces unoccupied by said yieldable projections between the gear teeth on said hub for limiting the movement of the latter with respect to said disc.

8. In a clutch plate, the combination of a disc, a hub centrally mounted on said disc, radially extending substantially V-shaped yieldable projections on said disc, spur gear teeth on said hub fitting between said projections, said V-shaped projections being of solid cross-section and having their narrower ends positioned between said gear teeth, and longitudinally extending slots in the narrower ends of said V-shaped projections.

9. In a clutch plate, the combination of a disc, a hub centrally mounted on said disc, radially extending substantially V-shaped yieldable projections on said disc, spur gear teeth on said hub fitting between said projections, said V-shaped projections being of solid cross-section and having their narrower ends positioned between said gear teeth, rigid pins extending transversely from said disc and disposed in spaces unoccupied by said yieldable projections between the gear teeth on said hub for limiting the movement of the latter with respect to said disc, and longitudinally extending slots in the narrower ends of said V-shaped projections.

10. In a clutch plate, the combination of a disc, a hub centrally mounted on said disc, outwardly extending projections on said hub having a substantially spur gear tooth conformation, and a plurality of inwardly extending, substantially V-shaped projections on said disc, said V-shaped projections being circumferentially yieldable and having their base portions integrally joined, the narrower ends of said V-shaped projections bearing against and fitting between said projections on said hub.

11. In a clutch plate, the combination of a disc, a hub centrally mounted on said disc, outwardly extending projections on said hub having a substantially spur gear tooth conformation, an annular member secured to said disc, and a plurality of substantially V-shaped projections extending from the inner periphery of said annular member, said V-shaped projections being circumferentially yieldable and adapted to bear against and fit between said projections on said hub.

CHARLES B. SPASE.